Jan. 3, 1967   TAKAICHI MABUCHI   3,296,473
BRUSH HOLDER MEANS OF A MINIATURE ELECTRIC MOTOR
Filed Dec. 17, 1963   2 Sheets-Sheet 1

INVENTOR
Takaichi Mabuchi
BY
ATTORNEYS

Jan. 3, 1967   TAKAICHI MABUCHI   3,296,473
BRUSH HOLDER MEANS OF A MINIATURE ELECTRIC MOTOR
Filed Dec. 17, 1963   2 Sheets-Sheet 2

INVENTOR
Takaichi Mabuchi
BY
ATTORNEYS

3,296,473
BRUSH HOLDER MEANS OF A MINIATURE ELECTRIC MOTOR
Takaichi Mabuchi, 262 Honden-cho, Tokyo, Japan
Filed Dec. 17, 1963, Ser. No. 331,302
Claims priority, application Japan, Apr. 22, 1963, 38/29,317
1 Claim. (Cl. 310—239)

The present invention relates to a brush holder means in a miniature electric motor.

An object of the present invention is to supply a miniature electric motor with a brush holder means, simple and quick in the assembling and firm and accurate in the working thereof.

Another object of the present invention is to supply a miniature electric motor with a brush holder means in which a brush holder being secured resiliently deformed to brush holder supports so as to have the brush holder secured rigidly by the frictional resistance produced by the resilient recovery force of the brush holder.

Still another object of the present invention is to supply a miniature electric motor with a brush holder means in which a brush holder is secured to brush holder supports in a simple manner in having the base end of the brush holder insertedly engaged with the brush holder supports thereof.

In consideration of the above objects and other objects that may be described hereinafter the alignment of the parts thereof will be described in the following specification and in the accompanying claim hereof.

Figure 1A:
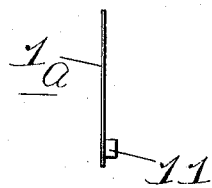
Figure 1B:
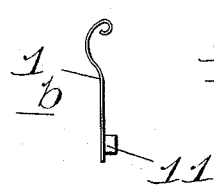
Figure 1C:
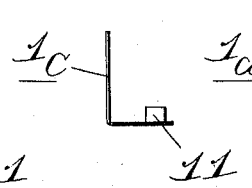
Figure 1D:
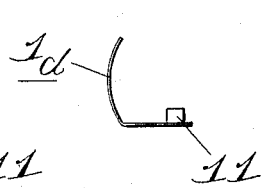
Figure 2A:
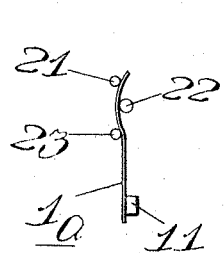
Figure 2B:
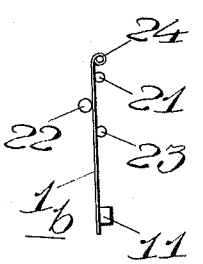
Figure 2C:
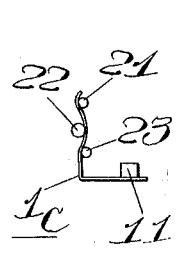
Figure 2D:
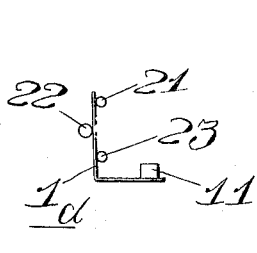
Figure 3:
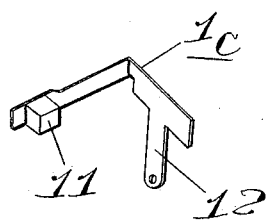
Figure 4:
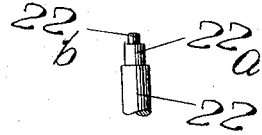
Figure 5:
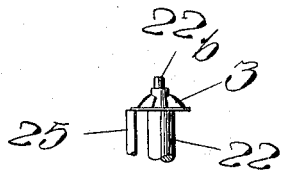
Figure 6:
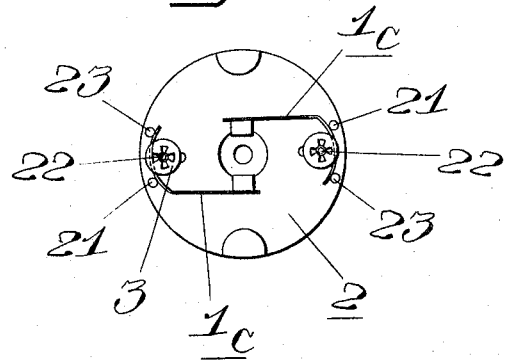
Figure 7:
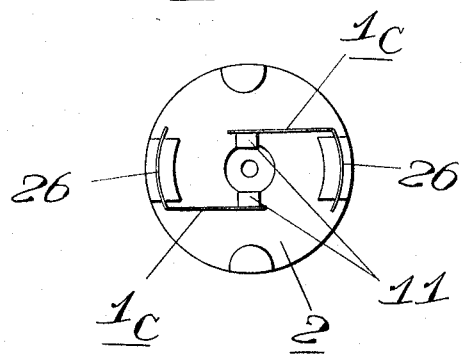

With reference to the accompanying drawings describing an embodiment according to the present invention, in which:

FIG. 1a, b, c, and d show the plan views of respective states of brush holders prior to being supported by supporters;

FIG. 2a, b, c, and d the plan views of respective states of the brush holders in being supported by supporters;

FIG. 3 a perspective view of an example of the brush holder prior to being supported by supporters;

FIG. 4 a plan view showing an example of the central support rod of the brush holder;

FIG. 5 a plan view showing an example of a mechanism for preventing the slipping out of the brush holder;

FIG. 6 a plan view showing an example of the brush holder means according to the present invention, and FIG. 7 a plan view showing another example of FIG. 6.

Now, describing an embodiment according to the present invention with reference to the accompanying drawings 1a, 1b, 1c, and 1d indicate the brush holders, respectively, 2 an insulation cover plate, and the brush holders 1a, 1b, 1c, 1d being made of a resilient material, to the front end of each of the brush holders a brush 11 being secured, the base portion thereof is formed into a lead plate 12 (FIG. 3). Of the brush holders prior to being supported, 1a is in a straight form, the base portion of 1b an arc form, 1c being bent 90° at its central portion the base end portion thereof being straight, and 1d being bent 90° at its ventral portion the base end portion is in an arc form. On the inner surface of the insulation cover plate 2, 3 support rods 21, 22, 23 being provided as shown in FIGS. 2 and 6, but the alignment of the brush holder, when the base end portion of the brush holder is supported by said rods, becomes such that the straight base portions of 1a, 1c turn to an arc form, respectively, as shown in FIG. 2, and the arc shaped base portions of 1b, 1d turn to a straight form, respectively. By this alignment the supported brush holder performs sufficiently one of the expected objects thereof, namely the slipping off and loosening thereof is prevented by the frictional resistance produced by the resilient recovery force of the brush holder, respectively, but in b of FIGS. 1 and 2 the base end of the brush holder being bent into a round arc form, the bent portion thereof being supported by another support rod 24 provided on the insulation cover plate 2, and a central support rod 22, as shown in FIGS. 4 and 5, being provided with diametrically reduced portions 22a and 22b in 2 steps on the upper portion thereof, the brush holder may be supported in having a set nut 3 with several resilient claws on the inner peripheral of an annular plate which is commonly called a speed nut, and also the same effect can be had in having simply an annular set nut fitted thereon, though not shown in the drawing, and further the same effect may be had in having the head portion of the rod formed into a flange shape by heat treatment. One indicated by a numeral 25 in FIG. 5 is the holding rod of the set nut 3 formed in integral with the insulation cover plate 2. Also, the lead plate 12 is conducted out through a hole bored on the insulation cover plate 2 though not shown in the drawing.

In the embodiment shown in FIG. 7 an arc formed grooves 26 being provided on the insulation cover plate 2 instead of the support rods 21, 22, 23, into the arc formed grooves 26 the straight base end of the brush body being fitted, whereby it is so made as to hold the brush holder by the frictional resistance produced by the resilient recovery force of the brush holder, but the same effect may be had in having the grooves made straight and the arc shaped base end of the brush holder fitted thereinto.

While the brush holder according to the present invention is such that as described above, the brush holder of the kind as publicly known has had its base portion secured by means of screws or by canking or otherwise. In consequence, the motor being a small type the brush holder has had defects that has required a long troublesome work in assembly and the cost thereof has become high at least to that extent, and also the screws may be loosened while in operation and may be detached entirely from the secured place and as a result thereof sparks may be generated in the increase in the consumption of power, and thereby the smooth operation of the motor cannot be performed.

However, according to the present invention as described hereinabove, the brush holder being constituted with the holder rods or grooves so formed as to be formed into an arc shape when the base end of the brush holder is straight, and into a straight form when the base end of the brush holder is in an arc shape, whereby said base end of the brush holder being held resiliently, the brush holder according to the present invention has advantages that the assembly thereof being extremely simple, the cost of a small motor being reduced to that extent, the brush being held securely without producing loosening, also the detachment of the brush holder being easy, and in addition, the working thereof is firm and secure.

The present invention has been described with reference to an embodiment thereof, but the present invention is not restricted to the embodiment as described, and it is apparent the present invention includes all the constructions within the scope of the accompanying claim hereof.

What is claimed is:

A brush holder particularly for small electric motors, comprising a resilient brush member of a predetermined configuration, and supporting means for said brush member holding at least a portion of said brush member in an outline different from its normal configuration to cause resilient engagement of said brush member against said supporting means, said brush member being held by said supporting means solely by resilient engagement, said supporting means comprising a member opened on at least one side for permitting withdrawal of said resilient brush member from said supporting means on said such side and comprising at least three spaced upright members said brush being alternately bent around adjacent ones of said members.

References Cited by the Examiner

UNITED STATES PATENTS

| | | | |
|---|---|---|---|
| 2,301,425 | 11/1942 | List | 310—46 |
| 2,451,959 | 10/1948 | Knudsen | 310—244 X |
| 3,204,138 | 8/1965 | Mabuchi | 310—244 X |

MILTON O. HIRSHFIELD, *Primary Examiner.*

D. F. DUGGAN, *Assistant Examiner.*